United States Patent
Hjertman et al.

[11] Patent Number: 6,134,920
[45] Date of Patent: Oct. 24, 2000

[54] METHOD OF PREPARING GLASS CARTRIDGES

[75] Inventors: Birger Hjertman, Vällingby, Sweden; Wolfgang Heidl, Münnerstadt, Germany

[73] Assignee: Pharmacia & Upjohn AB, Stockholm, Sweden

[21] Appl. No.: 08/973,730

[22] PCT Filed: Jun. 20, 1996

[86] PCT No.: PCT/SE96/00811

§ 371 Date: Mar. 9, 1998

§ 102(e) Date: Mar. 9, 1998

[87] PCT Pub. No.: WO97/00835

PCT Pub. Date: Jan. 9, 1997

[30] Foreign Application Priority Data

Jun. 22, 1995 [SE] Sweden .................................. 9502284

[51] Int. Cl.[7] .......................... C03B 21/00; C03B 23/00; C03B 23/04; C03B 25/00
[52] U.S. Cl. ................. 65/108; 65/109; 65/276; 65/282; 65/294; 65/298; 65/279
[58] Field of Search .............................. 65/108, 109, 276, 65/277, 282, 292, 294, 293, 296, 298, 278, 279, DIG. 9

[56] References Cited

U.S. PATENT DOCUMENTS

| | | |
|---|---|---|
| 8,677 | 4/1879 | Atterbury et al. . |
| 313,346 | 3/1885 | Leuffgen . |
| 507,572 | 10/1893 | Walsh, Jr. . |
| 509,525 | 11/1893 | Gray . |
| 2,209,739 | 7/1940 | Meyer . |
| 2,316,749 | 4/1943 | Powers . |
| 2,591,046 | 4/1952 | Brown . |
| 3,343,937 | 9/1967 | Lewis . |
| 3,360,352 | 12/1967 | Sundstrom et al. . |
| 3,427,143 | 2/1969 | Deery et al. . |
| 3,487,501 | 1/1970 | Siard et al. . |
| 4,247,319 | 1/1981 | Hofmann . |
| 4,968,299 | 11/1990 | Ahlstrand et al. . |
| 5,176,635 | 1/1993 | Dittmann . |
| 5,435,076 | 7/1995 | Hjertman et al. . |
| 5,501,673 | 3/1996 | Hjertman et al. . |

FOREIGN PATENT DOCUMENTS

| | | |
|---|---|---|
| 0331152 | 11/1991 | European Pat. Off. . |
| 7954 | 11/1896 | Sweden . |
| WO9511051 | 4/1995 | WIPO . |

OTHER PUBLICATIONS

International–Type Search Report for National Application No. 9502284–4, Request No. SE95/00619.

*Primary Examiner*—Stanley S. Silverman
*Assistant Examiner*—Jacqueline A. Ruller
*Attorney, Agent, or Firm*—Dinsmore & Shohl LLP

[57] ABSTRACT

Methods of plastically forming an axially extended zone of the interior surface of a hollow glass tube heated to its forming temperature employ a generally cylindrical embossing mandrel connected to a driving shaft. The hollow glass tube and the embossing mandrel are brought together at a predetermined start position for the embossing mandrel inside the glass tube and are brought into contact in an area in which the zone is to be formed on the interior surface of the glass tube. A relative rolling off planetary motion between the embossing mandrel and the glass tube is provided while plastically forming the zone of the glass tube and creating depressions therein. The rolling off planetary motion is achieved by (i) rotating the embossing mandrel around the longitudinal axes of the embossing mandrel and the glass tube, (ii) rotating the embossing mandrel around its longitudinal axis and rotating the glass tube around its longitudinal axis, or (iii) rotating the glass tube around the longitudinal axes of the glass tube and the embossing mandrel. The glass tube and embossing mandrel are then separated.

25 Claims, 4 Drawing Sheets

METHOD OF PREPARING GLASS CARTRIDGES

FIELD OF INVENTION

The present invention refers to a method of forming an interior surface of a hollow tubular article made of glass, useful as a cartridge for medical substances, and also to a glass cartridge prepared by the method. The method comprises a process of several steps of processing a predetermined zone of the interior surface of a hollow tubular article made of glass into a bypass area suitable for a glass cartridge of a multichamber type intended to be filled with medical preparations.

BACKGROUND OF THE INVENTION

In the production of pharmaceuticals, the technique of multichamber chamber cartridges for separately storing pharmaceuticals and a liquid diluent, just prior to the administration, has found a wide spread use for such pharmaceutically active components which are unstable during storage as a solution. Dual chamber cartridges has become state of the art especially for providing suitable administration systems for lyophilized polypeptides or proteins produced by recombinant technology, such as human growth hormone and Factor VIII which must be stored in solid form to not lose activity. Normally, a solution of the pharmaceutical is introduced and freeze dried to solid form directly in a designated chamber of a cartridge, or of a syringe barrel, which thereafter is sealed until just prior to the administration, as is disclosed in the European patent specification EP 331 152. The two chambers containing a solid pharmaceutical and a liquid diluent for reconstitution are often separated by a movable wall in the form of a flexible piston which seals against the interior wall of the glass cartridge. The rear chamber, usually containing the liquid, is also sealed at its rear end with a rear piston which seals against the interior wall. When the cartridge shall be used, the rear piston is pushed forward, whereupon a pressure is exerted on the liquid diluent large enough to urge the movable wall a determined distance forwards to a non-sealing position in front of a bypass channel where the liquid can flow from the rear chamber to the front chamber and dissolve the solid pharmaceutical to provide a reconstituted preparation possible to administer immediately.

In many applications it is important that the reconstitution is performed very carefully, because the proteins are highly sensitive for shaking and whirling which lead to loss of biological activity. A solution to this problem is introduced in the European patent specification EP 298 067 which describes how to successfully perform a gentle reconstitution in a dual-chamber cartridge operated by an injection device. It is disclosed how a screw motion can enable a piston rod to perform a controlled forwards motion while displacing the rear piston of the cartridge forwards to a bypass position, so a controlled liquid overflow to the front chamber gives a controlled and mild reconstitution.

However, conventional dual-chamber cartridges of the type described with a external, radially extended bypass channel formed as a longitudinal ridge are bulky and makes it necessary to use injection devices with undesirably thick barrels. This is a drawback when there is a demand to reduce injection devices both in longitudinal and radial size, as is disclosed in the International patent application WO 93/20869. In addition, such bulky bypasses makes the cartridges sensitive during the handling and leads to that many expensive products must be discarded. Moreover, such bypass channels in the form of longitudinal ridges are usually made by blow forming heated glass tubes with pressurized air, which is an expensive method with a rather low precision and reproducibility.

According to the International patent application WO 93/20868, the bypasses formed of a longitudinally extended ridge can be successfully substituted with a bypass area consisting of controlled modifications in the interior wall of a glass cartridge. Such a modified bypass area can typically comprise a plurality of shallow channels distributed around the interior periphery of the cartridge. A highly advantageous embodiment of this type of bypass area is disclosed in the International patent application WO 95/11051. Such a modified area has a plurality of lands and grooves with an inclined direction in relation to the axial direction of the cartridge, and is axially extended to form a predetermined bypass zone in the interior peripheral wall. Preferably, the lands and grooves extend inward from the interior wall of the cartridge, so the interior diameter between the lands is smaller than the nominal diameter of the cartridge. It was also shown that when manufacturing the bypass area with a rotating embossing tool on the heated glass cartridges, vibrations due to the embossing action could appear which might lead to a distortion of the cartridge. This problem has found its solution unexpectedly well by letting the lands and grooves be embossed at an angle to the longitudinal axis of the cartridge. It was found that if the angle were between 5 and 45 degrees, preferably between 10 and 30 degrees and most preferably about 20 degrees, no such vibrations occurred.

The present invention provides a novel method of manufacturing such lands and grooves by treating glass cartridges or comparable hollow glass articles of a tubular form with a multistep method of plastically forming a zone of their interior surface, which is found to be surprisingly advantageous when a relative rolling off motion is provided between an embossing mandrel and the cartridge during the forming.

The present invention is also directed to glass cartridges having a bypass zone manufactured by said method.

In addition, the present invention provides a specific embossing mandrel which is to be used in the said method.

DESCRIPTION OF THE INVENTION

Generally, the inventive method comprises the plastically forming of an axially extended zone of the interior surface of a hollow glass tube heated to its forming temperature with the following subsequent steps of:

a) bringing the hollow glass tube and a generally cylindrical embossing mandrel connected to a driving shaft together in order to obtain a predetermined start position for the mandrel inside said hollow glass tube:

b) bringing the embossing mandrel and the interior surface of the glass into contact with said zone;

c) providing a relative rolling off motion between the said mandrel and the said tube, while plastically forming said zone of the glass tube;

d) separating the formed glass tube and the embossing mandrel.

The heating of the hollow glass tube to its forming temperature can be performed either before or after bringing the glass tube and the embossing together, but preferably the heating is performed after bringing them together. Preferably, the longitudinal axes of the mandrel and the glass tube are essentially parallel while forming the zone of the glass tube. Deviations from the parallel position during the forming should be avoided, since it may lead to impaired products. It is to be understood that during the forming, the hollow glass tube is attached to a suitable device which maintains its longitudinal axis during the forming and which can provide the hollow glass tube with a predetermined rotational movement. The devices for attaching the hollow glass tube will discussed more in detail below. After separating the formed glass tube and the embossing mandrel, the processed glass tube is removed and a new glass tube can be subjected to the method in a repeated cycle.

Preferably, the hollow glass tube is attached in one end and displaced to the predetermined starting position of the embossing mandrel. When plastically forming the predetermined zone, a relative rolling off motion between the embossing mandrel and the hollow glass tube is performed. Such a relative rolling off motion shall by definition comprise the condition when the embossing mandrel performs a planetary motion along a the interior circumference of the non-moving hollow glass tube and when the embossing mandrel only is rotated about its own axis while forming a zone of the interior circumference of rotating or rotatable hollow glass tube. A relative rolling off motion between said mandrel and said hollow tube will also comprise the condition when the mandrel is non-moving and the hollow tube is moved about the longitudinal axis of the mandrel, while it at the same time moves about its own longitudinal axis.

According to a first preferred embodiment of the invention the embossing mandrel is displaced in a radial direction from its starting position and pressed into the interior surface of the glass tube and the axially extended zone is formed by rotating said mandrel about its longitudinal axis.

According to one preferred aspect of this first embodiment, the embossing mandrel can be driven in a planetary motion with respect to the longitudinal axis of the hollow glass tube while said tube is fixed by devices for its attachment. This motion is defined in that the embossing mandrel rotates about its own longitudinal axis while it at the same time rotates about the longitudinal axis of the glass tube. It is preferred that the embossing mandrel is rotated one complete turn around the interior surface of the hollow glass tube when forming said axially extended zone.

According to a second aspect of this first embodiment, the hollow glass tube can be rotated in the same direction as the embossing mandrel, while forming the axially extended zone. It is preferred that the glass is rotated one complete turn according to this aspect.

According to a second embodiment of the inventive method, the hollow glass tube is displaced and pressed into the embossing mandrel in its starting position. The hollow glass tube is thereafter rotated about its own axis while it, at the same time, rotates around the fixed axis of the embossing mandrel, in order to form the axially extended zone. Preferably the glass tube is rotated one complete turn around the non-moving embossing mandrel.

During the method of forming an axially extended zone of the hollow glass tube with the embossing mandrel, a supporting device, preferably having an extension at least corresponding to the said zone, is applied from the outside of glass tube, in order retain the shape of the glass tube during the forming. The supporting device will generally have a shape supportingly fitting the outer peripheral surface of the glass tube. It is also to be understood that the supporting device must be capable of permitting a rotating movement of the hollow glass tube if the mentioned alternative embodiments of the inventive require that such a motion shall be performed.

As discussed above, the hollow glass tube is attached in at least one end to device which is capable provide it with rotational movement during the heating and/or the formation with the embossing mandrel. This device should also in accordance with the above mentioned second embodiment be capable of providing a relative rolling off motion around a fixed or non-moving embossing mandrel. It is preferred that the ends of the hollow glass tube are fastened by two releasable synchronously rotatable securing devices. It is also preferred that the securing devices can rotate the hollow glass tube during the heating of the zone at predetermined, fixed distance from a heat source. It may, however, be possible in other applications of the inventive method to use a heat source which is rotated at a constant distance around the fixed glass tube. A rotating movement may also, as mentioned in the foregoing, be required for rotating the glass tube during the forming with the embossing mandrel.

According to the inventive method, it is preferred if the diameter of the largest cross-sectional area of embossing mandrel is at least half the interior diameter of the unformed hollow glass tube, in order to obtain a high precision embossing treatment and a mechanically stable construction. It is even more preferred if said diameter is at least 75% of the interior diameter of said glass tube.

Preferably, the length of the predetermined zone to be formed with the inventive method is less than half the total length of the hollow glass tube. The area so formed with the embossing mandrel will therefore always be less than the area of the untreated interior surface.

Also in accordance with the inventive method, the predetermined area is preferably not selected at the ends of the hollow glass tubes. Consequently, it is preferred to have an unformed surface present at the ends of a glass tube.

The inventive method is suitable for forming a ring-shaped zone, but there are no limitations in obtaining plural ring-shaped treated areas along the interior periphery of the hollow glass tube, if for example plural embossing mandrels of identical or different shape are connected to the same shaft and driven simultaneously, in the manner described above. It would certainly also be within the scope of the method to employ two different shafts brought together with the hollow glass tube and driven separately two obtain plural ring shaped zones. It may also be possible to obtain segments of the formed ring-shaped zone, if an embossing mandrel is rotated only a correspondent part of a complete turn around the interior periphery of the hollow glass tube by the described relative rolling off motion.

The embossing mandrels to be used in the method are regarded as objects of the present invention per se. They are preferably provided with embossing ridges which are uniformly spaced apart along its circumference. The ridges are preferably are helically arranged on the peripheral surface of the mandrel. It is preferred that each portion or recess connecting two adjacent ridges has a concave profile in section, and according to a particularly preferred embodiment, the profiles are circular. In general, also other sectional profile shapes can be used according the invention.

The method disclosed above is highly suitable for processing glass cartridges for medical use. An important part of the present invention is therefore glass cartridges produced with the method, wherein their treated interior surfaces constitute one or several bypass zones between two or more chambers respectively designated for different components which shall be kept apart during storage in the cartridge, but mixed, just prior to their administration. The zones have the function of establishing a bypass liquid connection between the said chambers when a sealing movable wall dividing the said cartridges is displaced into the said bypass zones, where its sealing effect ceases. The components can thereby be reconstituted into a liquid pharmaceutical for instant administration. Preferably such a cartridge is a two chamber cartridge with ring-shaped bypass zone intended for separate storage of solid drug and its diluent.

In the following part a more detailed description of an operable embodiment of the invention is presented which by no means shall be considered as limiting for the present invention, as it is expressed in the appended set of claims.

DETAILED DESCRIPTION OF THE INVENTION

FIG. 1 to 3 schematically shows the mentioned different embodiments of how to accomplish the relative rolling off motion according to the inventive method according to the invention when the embossing mandrel and the hollow glass tube are brought together to the predetermined starting position.

Figure 1A:
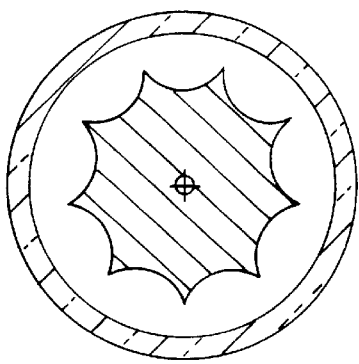
Figure 1B:
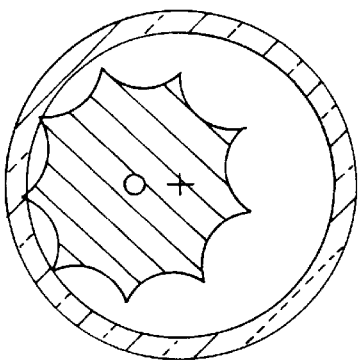
Figure 1C:
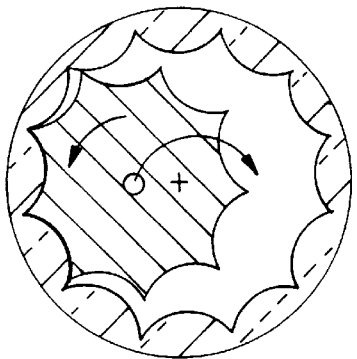
Figure 2A:
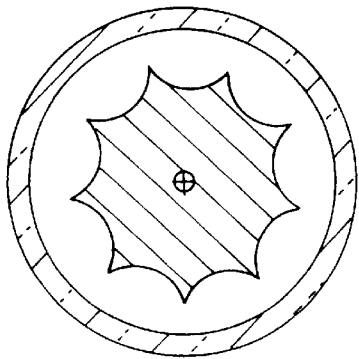
Figure 2B:
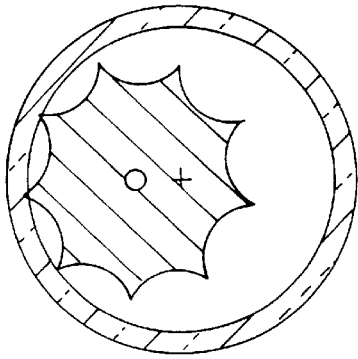
Figure 2C:
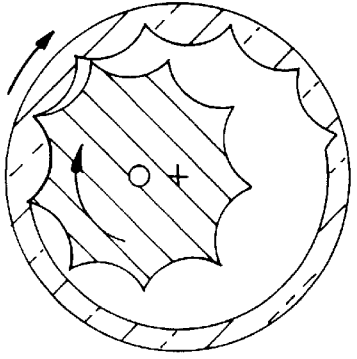
Figure 3A:
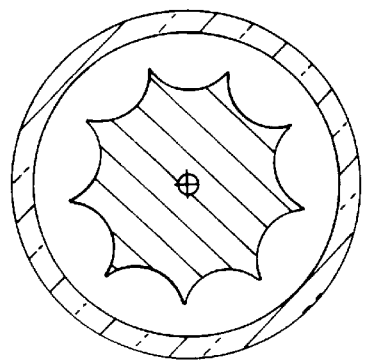
Figure 3B:
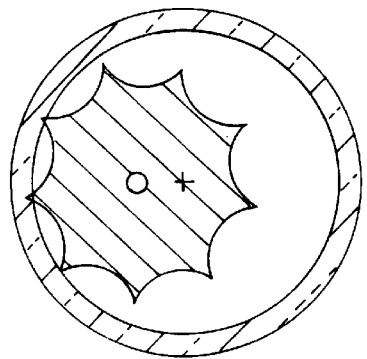
Figure 3C:
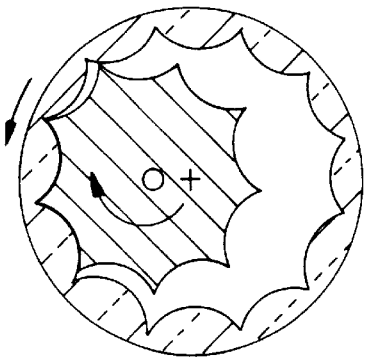

FIGS. 1 to 3 show three alternative ways to obtain the relative rolling off motion between the embossing mandrel and an interior surface of the hollow glass tube. FIG. 1 demonstrates a preferred type of relative rolling off motion accomplished by bringing the embossing mandrel and the hollow glass tube together at a predetermined start position facing the axially extended zone which is to be plastically formed, see FIG. 1A. The mandrel is then radially displaced to a position where it is in contacts and is pressed into the heated and softened interior surface a predetermined distance, see FIG. 1B. Thereafter the mandrel is driven with a planetary motion with respect to the longitudinal central axis of the glass tube, as shown in FIG. 1C, while glass tube is kept still. FIG. 2 shows an alternative embodiment of the relative rolling off motion in FIG. 1 which is obtained by an identical introduction and displacement of the mandrel according to FIG. 2A and 2B, as shown in FIGS. 1A and 1B. However, when forming the zone in this embodiment, the hollow glass tube is rotated about its own central longitudinal axis while, at the same time, the embossing mandrel rotates about its own longitudinal axis in the same rotary direction, see FIG. 2C. In FIG. 3 still another embodiment to obtain the relative rolling off motion is demonstrated. According to this embodiment the hollow glass tube is displaced from the coaxial position shown in FIG. 3A to position where its heat softened interior surface is pressed into the embossing mandrel, see FIG. 3B. The hollow glass tube is thereafter rotated about its own longitudinal axis to form the axially extended zone. In all the embodiments demonstrated, the rotary speed of the mandrel and/or the hollow glass tube must be carefully controlled and selected to obtain formed zones of a high and repeatable quality. Such measures can be readily done by persons skilled in this art and will not be discussed in more detail.

The primary material to be processed will preferably be cut into hollow glass tubes of suitable lengths by a diamond cutter. It is necessary to clean the cut tubes carefully from all particles and to control the dimensions of the tubes before subjecting them to the inventive method. Such preparative measures for pre-treatment of the hollow glass tubes can be used herein which are applied when manufacturing medical lenses for ocular use.

Figure 4:
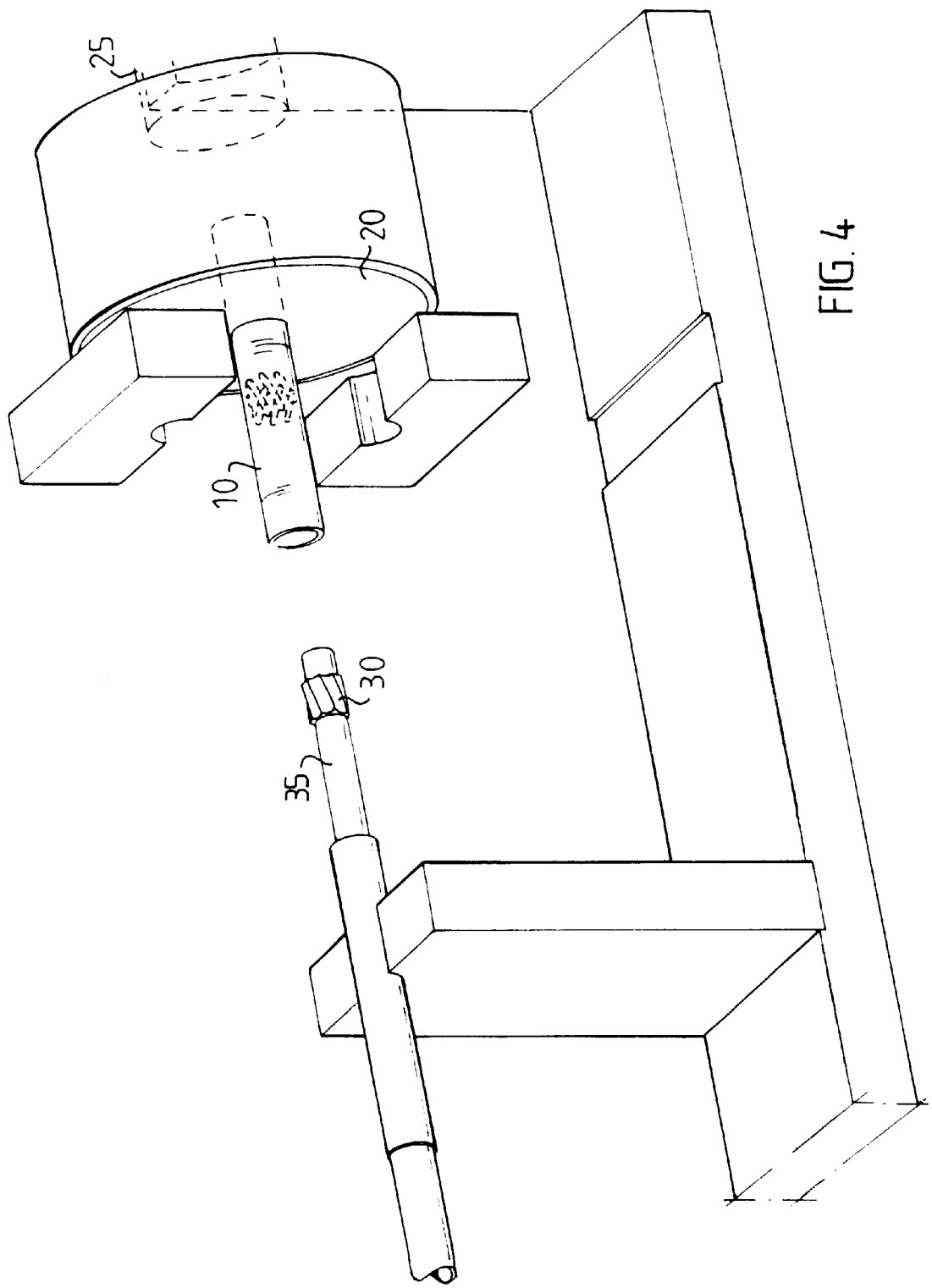
FIG. 4 is principal view of the method, according to a preferred embodiment of the invention, of how to accomplish the inventive method before the embossing mandrel and the hollow glass tube are brought together.

FIG. 4 demonstrates how to accomplish the most preferred embodiment of the present invention. The method of processing the hollow glass tubes is performed horizontally with the tools involved arranged and driven on horizontal axes. In accordance with FIG. 4, one end of the pre-treated hollow glass tube (10) is fastened with the securing device of an automatically operable chuck (20) engaging said end of the hollow glass tube with high precision in at least three points. The chuck is driven by a shaft (25) connected to a driving motor. The hollow glass tube is coaxially displaced over the embossing mandrel (30) connected to a driving shaft (35) at an exactly defined predetermined position facing the zone to be formed. These devices used for herein are principally well known to those skilled in machining practice and will not be discussed in further detail.

Figure 5:
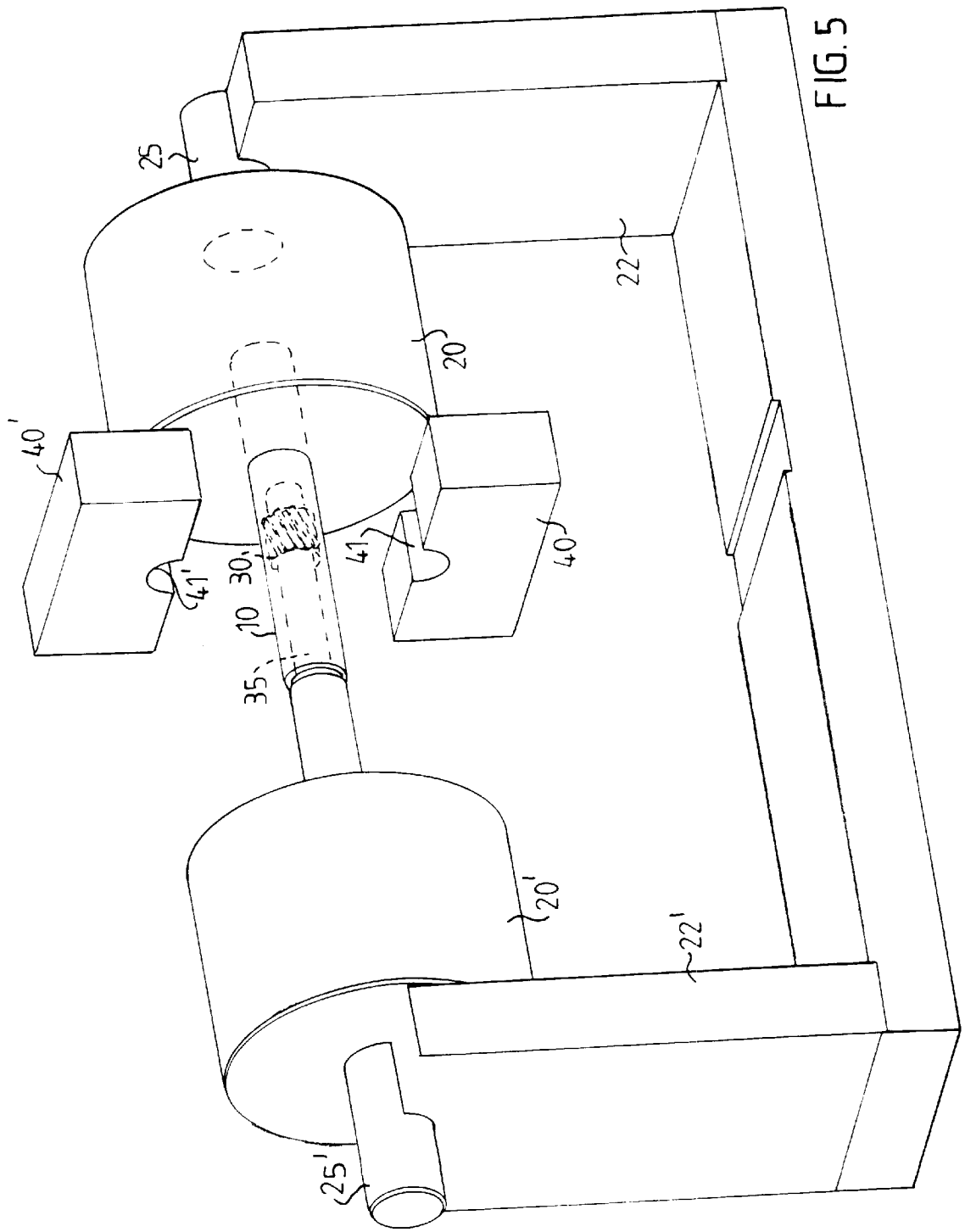
FIG. 5 is a principal view of performing the preferred embodiment of the inventive method according to FIG. 4 with the hollow glass fastened in the movable chucks and with the embossing mandrel in working position.

As best seen in FIG. 5, after bringing the embossing mandrel and the glass tube together, the tube is identically fastened with a second identical chuck (20'), surrounding the driving shaft as of the embossing mandrel. The chucks (20, 20') can be driven synchronically with a high precision when rotating the hollow glass tube during the heating step at fixed distance from a heat source (not shown). The heat source can be a conventional open flame, but also other types of heat sources are conceivable.

After heating the tube to a temperature suitable for plastic forming, the embossing mandrel is radially displaced from its starting position to the interior surface of the tube in accordance with FIG. 1B or FIG. 2B. The embossing mandrel will now, by means of the driving shaft (35) connected to a driving equipment, perform a carefully controlled planetary motion with respect to the longitudinal axis of the non-moving hollow glass tube. The driving equipment for the shaft has the capacity of being adjusted to perform the desired rotational movements and also the preferably the capacity of being steered together with the devices which perform the rotational movement of the chucks securing the attachment of the glass tube. It is important that the longitudinal axes of the glass tube and the embossing mandrel are kept parallel during the entire forming procedure. This type of equipment is familiar to persons skilled machining processes and therefore not more detailly described herein. The process is preferably performed in a housing or frame (not shown) and shafts can be supported by means (22, 22').

In the method demonstrated in FIG. 1 to FIG. 5, the embossing mandrel is preferably rotated exactly one turn around the interior periphery of the of the glass tube during the forming, so a ring shaped formed zone is produced. When forming the zone with the embossing mandrel, a supporting device (40, 40'), having an axial extension corresponding at least to the zone, is applied from the outside, so the shape of the glass tube is maintained after the forming process. As best seen in FIG. 5, the supporting device is shaped with two recesses (41, 41') which are generally semicircular in cross-section, in order to fit the shape of the glass tube. It is to be understood that the supporting device is possible to displace to its supporting position and to be removed therefrom after the forming is finished. The movements of the supporting device to and from the glass tube is suitably automatic and possible to controlled together with the other devices used in the forming procedure. After the forming with the embossing mandrel is completed, it is released from the interior surface of the glass tube and returned to its starting position and the supporting device is removed from the outer surface of the glass tube. The formed glass tube is displaced from the position facing the embossing mandrel and disengaged from the chucks, whereupon a new cycle of the method can be performed, in an identical manner.

Figure 6:
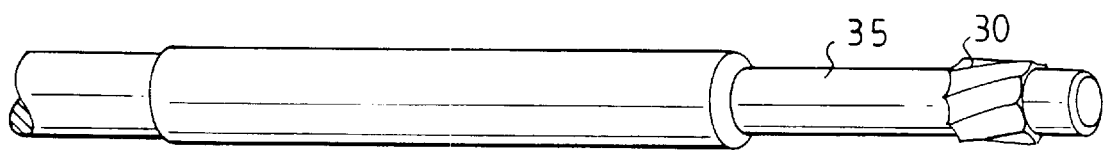
FIG. 6 shows an inventive embossing mandrel connected to its driving shaft.
Figure 7:
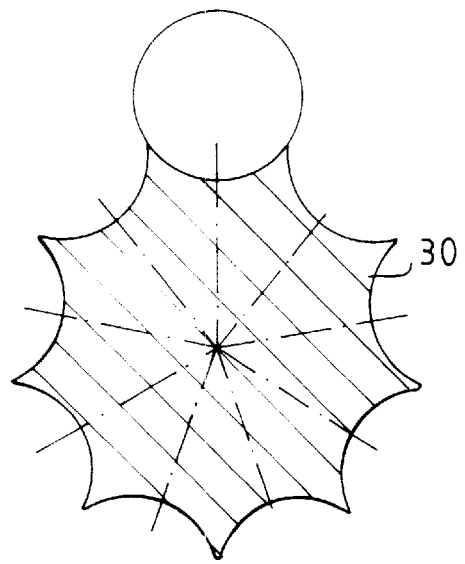
FIG. 7 is a sectional view of an inventive embossing mandrel.

FIG. 6 and FIG. 7 show an example of an embossing mandrel which is successfully used in the described method in side view and in cross-section, respectively. In FIG. 6 the helically arranged and uniformly spaced apart ridges on the peripheral surface of the mandrel are demonstrated. In FIG. 7 it is demonstrated that the exemplified mandrel has nine ridges evenly distributed around its circumference. There are consequently nine concave recesses in the portions connecting two adjacent ridges. In this embodiment the recesses have a circular shape in section. This mandrel will, when used for forming the interior surface of the glass tube, provide a zone comprising inclined lands and grooves which in cross-section have a sinusoidal shape which in certain applications can be an advantageous shape when forming bypass zones around a resilient, axially displaceable plunger. It is to be understood that the mandrel having nine ridges will produced ten inclined grooves around the interior periphery of the hollow glass tube. A bypass zone in a medical dual-chamber cartridge produced by means of the inventive method when using the exemplified mandrel will consequently have ten grooves which are inclined in relation to its longitudinal axis. An elastic plunger will be somewhat deformed around its circumference in such a bypass zone, so a plurality of bypass channels for liquid communication between the chambers of the cartridge are formed.

The relationship between the interior diameter of the hollow glass tube and the outer diameter of the embossing mandrel is a highly important parameter for obtain specific and reproducible results of the method. In the production of the mentioned inclined lands and grooves of a bypass-zone, a suitable interior diameter of the glass tube is 6 mm and an outer diameter of the embossing mandrel is 5.8 mm. The nine arcuate recesses between the ridges will in this case belong to circles having the radius of 1 mm. A preferred material to be used in the embossing mandrel is hard carbide steel. During experiments with the inventive cylinders it has been demonstrated that ordinary embossing mandrels made of ordinary crucible steel are worn out already after about 8000 performances, whereas cylinders made of hard carbide steel have been used for more than 100 000 embossing performances without being wasted.

In the method described herein it has been disclosed how to plastically form zones of interior surfaces of hollow glass tubes. It is to be understood that hollow tubes of other materials, for instances certain polymers, can be subjected to the inventive method. The subject-matters of the present invention as disclosed by the appended claims shall therefore not be regarded as limited only to glass tubes, but to should also be considered to include tube formed articles made of materials with similar processing capacity as glass.

We claim:

1. A method of plastically forming an axially extended zone of the interior surface of a hollow glass tube heated to its forming temperature, comprising the following steps:
    a) bringing the hollow glass tube and a generally cylindrical embossing mandrel connected to a driving shaft together at a predetermined start position for the embossing mandrel inside the glass tube;
    b) bringing the embossing mandrel and the interior surface of the glass tube into contact in an area in which the zone is to be formed;
    c) providing a relative rolling off planetary motion between the embossing mandrel and the glass tube while plastically forming the zone of the glass tube and creating depressions therein, the rolling off planetary motion comprising (i) rotating the embossing mandrel around the longitudinal axes of the embossing mandrel and the glass tube, (ii) rotating the embossing mandrel around its longitudinal axis and rotating the glass tube around its longitudinal axis, or (iii) rotating the glass tube around the longitudinal axes of the glass tube and the embossing mandrel; and
    d) separating the glass tube and the embossing mandrel.

2. A method of plastically forming an axially extended zone of the interior surface of a hollow glass tube, comprising the following steps:
    a) heating the glass tube in an area in which the zone is to be formed to a forming temperature;
    b) displacing a generally cylindrical embossing mandrel, connected to a driving shaft, to a predetermined starting position inside the glass tube;
    c) bringing the embossing mandrel and the interior surface of the glass tube into contact in the area in which the zone is to be formed while keeping the longitudinal axes of the embossing mandrel and the glass tube essentially parallel;
    d) providing a relative rolling off planetary motion between the embossing mandrel and the glass tube while plastically forming the zone of the glass tube and creating depressions therein, the rolling off planetary motion comprising (i) rotating the embossing mandrel around the longitudinal axes of the embossing mandrel and the glass tube, (ii) rotating the embossing mandrel around its longitudinal axis and rotating the glass tube around its longitudinal axis, or (iii) rotating the glass tube around the longitudinal axes of the glass tube and the embossing mandrel; and
    e) separating the glass tube and the embossing mandrel.

3. A method according to claim 1, comprising displacing said glass tube to the predetermined starting position of the embossing mandrel.

4. A method according to claim 1, wherein step c) comprises displacing the embossing mandrel from the starting position and pressing it into the interior surface of the glass tube, and further wherein step d) comprises rotating the embossing mandrel about its longitudinal axis.

5. A method according to claim 4, wherein the rolling off planetary motion comprises rotating the embossing mandrel around the longitudinal axes of the embossing mandrel and the glass tube.

6. A method according to claim 5, wherein the embossing mandrel is driven one complete turn around the interior surface of the hollow glass tube while plastically forming said axially extended zone in the rolling off planetary motion.

7. A method according to claim 1, comprising applying a supporting device to the glass tube during the forming of the zone.

8. A method according to claim 1, wherein the rolling off planetary motion comprises rotating the embossing mandrel around the longitudinal axes of the embossing mandrel and the glass tube and holding the hollow glass tube in a fixed position while forming the axially extended zone.

9. A method according to claim 1, wherein the embossing mandrel and the hollow glass tube are rotated in the same direction while forming the axially extended zone.

10. A method according to claim 1, wherein the embossing mandrel is provided with uniformly spaced apart ridges along its circumference.

11. A method according to claim 10, wherein the ridges are helically arranged on the peripheral surface of the embossing mandrel.

12. A method according to claim 1, wherein the ends of the hollow glass tube are fastened by two releasable synchronously rotatable securing devices.

13. A method according to claim 1, wherein the area of the axially extended zone is less than half of the area of the total interior surface of the glass tube.

14. A method according to claim 1, wherein the hollow glass tube includes end parts and each end part of the hollow glass tube has an interior surface free of the zone.

15. A method according to claim 1, wherein the largest diameter of the embossing mandrel is at least half of the interior diameter of the glass tube before the axially extended zone is formed therein.

16. A method according to claim 1, wherein at least two embossing mandrels are connected to the same driving shaft.

17. A method of plastically forming an axially extended zone of an interior surface of a hollow glass tube heated to its forming temperature, comprising the following steps:
 a) bringing the hollow glass tube and a generally cylindrical embossing mandrel connected to a driving shaft together at a predetermined start position for the embossing mandrel inside the glass tube;
 b) bringing the embossing mandrel and the interior surface of the glass tube into contact in an area in which the zone is to be formed by displacing the glass tube and pressing the glass tube into the embossing mandrel in the start position;
 c) providing a relative rolling off motion between the embossing mandrel and the glass tube while plastically forming said zone of the glass tube by rotating the glass tube about its own axis while simultaneously letting the glass tube rotate around a fixed axis of the embossing mandrel to form the axially extended zone; and
 d) separating the glass tube and the embossing mandrel.

18. An embossing mandrel and hollow glass tube combination for plastically forming grooves on an interior surface of the hollow glass tube, the combination comprising an embossing mandrel having a number of axially extended parallel embossing ridges uniformly spaced apart along its circumference, and a hollow glass tube, an inner diameter of the glass tube and an outer diameter of the embossing mandrel being constructed to provide a greater number of grooves on an interior surface circumference of the glass tube as compared with the number of ridges on the embossing mandrel outer circumference.

19. A method according to claim 17 wherein the glass tube is rotated one complete turn around the embossing mandrel.

20. A method according to claim 17 wherein the embossing mandrel is rotated about its own longitudinal axis during said forming.

21. A combination according to claim 18, wherein the ridges are helically arranged on the peripheral surface of the embossing mandrel.

22. A combination according to claim 18, wherein the embossing mandrel comprises a portion between each connecting two adjacent ridges, wherein each portion has a concave profile in section.

23. A combination according to claim 22, wherein the concave profile is circular in section.

24. A combination according to claim 18, wherein the embossing mandrel comprises nine equidistant ridges along its peripheral surface.

25. A method for plastically forming the interior surface of a hollow glass tube, comprising embossing the surface of a hollow glass tube and creating depressions therein with an embossing mandrel using the combination according to claim 18.

* * * * *